(12) United States Patent
Poupardin et al.

(10) Patent No.: US 6,946,014 B2
(45) Date of Patent: Sep. 20, 2005

(54) METHOD FOR OXIDIZING TREATMENT OF STEEL PLANT SLAG TO OBTAIN CEMENT-BASED MATERIALS

(75) Inventors: Valerie Michaud Poupardin, Lyons (FR); Francois Sorrentino, Meyzieu (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 10/467,024

(22) PCT Filed: Feb. 1, 2002

(86) PCT No.: PCT/FR02/00395

§ 371 (c)(1),
(2), (4) Date: Dec. 30, 2003

(87) PCT Pub. No.: WO02/062720

PCT Pub. Date: Aug. 15, 2002

(65) Prior Publication Data

US 2004/0093988 A1 May 20, 2004

(30) Foreign Application Priority Data

Feb. 2, 2001 (FR) .............................. 01 01451

(51) Int. Cl.$^7$ ................................. C21B 3/08
(52) U.S. Cl. .......................................... 75/434; 106/789
(58) Field of Search ............................. 75/434; 106/789

(56) References Cited

U.S. PATENT DOCUMENTS 5,395,443 A * 3/1995 Hooykaas ..................... 106/789
2004/0020411 A1 * 2/2004 Sorrentino et al. .......... 106/789

* cited by examiner

Primary Examiner—Melvyn Andrews
(74) Attorney, Agent, or Firm—Young & Thompson

(57) ABSTRACT

A method for treating a raw steel plant slag to transform it into a hydraulic binder at least equivalent to a Portland cement clinker, comprises the following steps: oxidizing treatment with input of oxygen, air or a mixture thereof at a pressure ranging between 1 to 15 bars, at a temperature ranging between 1650 and 1400° C., of raw steel slag containing, relative to the raw slag total weight, at least 45 wt. % of CaO and less than 30 wt. % of $Fe_2O_3$; and adding to the slag a lime source optionally with silica and/or alumina, so that the slag, after tranformation and at room temperature, has a propotion of $Fe_2O_3$ of less than 13 wt. % and a mineralogical composition comprising at least 40 wt. % in $C_3S$ mineralogical phase and more than 10 wt. %, of calcium ferrite, relative to the final slag total weight.

17 Claims, 2 Drawing Sheets

METHOD FOR OXIDIZING TREATMENT OF STEEL PLANT SLAG TO OBTAIN CEMENT-BASED MATERIALS

CROSS REFERENCE TO RELATED APPLICATION

This is the 35 USC 371 national stage of international application PCT/FR02/00395 filed on Feb. 1, 2002, which designated the United States of America.

FIELD OF THE INVENTION

The present invention generally relates to treating steel industry slag for giving them hydraulic binder properties.

In particular, the invention relates to a treatment process for steel industry slag resulting in treated slag, the mineral composition of which makes them synthetic materials having better performance when used for building (concrete or road granulates, hydraulic binders or binders with hydraulic potential).

BACKGROUND OF THE INVENTION

Obtaining hydraulic products or products with hydraulic potential from $CO_2$ emission free raw materials meets with problems being inherent to their chemistry and mineral contents being adverse for obtaining a binder.

It is meant under "adverse" that the resulting product will not be useful, neither alone, nor possibly mixed with Portland cement as it will not give the strength performance required from the standards or as it will generate swelling and structural destruction problems. This is the case for LD slag (coming from solidified and ground steel industry slag).

LD slag is by-products from refining of hematite cast irons (cast irons with low phosphorus content) through the oxygen blowing process. Such a material has a high iron and lime content with a mean mineralogical composition resulting from the assembly formed with dicalcium silicates, calcium ferrite and metal oxides, so that the mean chemical composition of the main components is as follows:

| Compound | % weight |
| --- | --- |
| CaO | 50 |
| $SiO_2$ | 13 |
| $Al_2O_3$ | 3 |
| MgO | 6 |
| Iron oxides | 28 |
| Free iron | Up to 20 |
| Free CaO | Up to 10 |

Using LD slag in the form of granulates for concrete or road building for producing bitumen top layers and foundation layers is limited by the presence of free lime subject to create road or concrete expansions.

Converting LD slag into hydraulic binder also arouses quite a lot of interest.

Patent FR-2,546,530 discloses a treatment for steel industry slag with a view to their use as cement.

The treatment being disclosed in said patent consists in adding to the liquid slag a compound (bauxite) supplying alumina and a compound (aluminium) forming alumina, supplying the amount of heat required for dissolving the compounds in the slag and subjecting the slag to an oxygen mixing.

The amount of the compound(s) being able to form the alumina to be added to the slag is such that the treated slag contains 5 to 25% in weight of alumina.

Although Patent FR-2,546,530 discloses that the thus treated slag can be used as a hydraulic binder, including for producing cement, such a treatment does not make it possible to obtain a hydraulic binder as such, being able to entirely replace Portland cement.

Patent DE-2,611,889 discloses the oxidative treatment of residues from the steel industry through addition of lime followed with a very fast cooling step for obtaining a granulate with which 3 to 8% in weight of gypsum is ground.

The treated metallurgical residues primarily comprise furnace slag.

More precisely, such a process discloses a process for converting 60 to 90% of metallurgical scraps through addition of 10 to 40% in weight of lime. However, the thus treated scraps consist in 35% steel industry slag, mixed with 48% furnace slag and 17% other steel manufacturing scraps. Only approximately 20 to 32% of steel industry slag is actually treated.

The LD slag treated using such a process have a relatively low CaO content (<45% in weight) and a high $Fe_2O_3$ content (>30% in weight). Moreover, such a treatment occurs at a high temperature ranging from 1,600 to 1,750° C., preferably from 1,650 to 1,700° C. and requires an additional fuel to be used, such as coke.

The Applicant knows an oxidative treatment for steel industry slag, comprising the steps of adding to the slag an alumina source and a lime source and cooling them adequately for obtaining a treated slag having a mineral composition meeting one of the following compositions:

(a) an amorphous glassy phase;

(b) a first phase assembly (1) consisting, in % weight, in 10–40 CA, 20–50 C2AS, 30–50 C6AF2 and 10–30 C2S;

(c) a second phase assembly (2) consisting, in % weight, in 20–40 C2F, 10–30 C2AS, 20–50 C6AF2 and 10–40 C2S; and (d) a mixture of an amorphous glassy phase and of the first or the second phase assembly.

According to the conventional cement manufacturers' expressions, it should be reminded that:

C=CaO $A=Al_2O_3$ $S=SiO_2$ $F=Fe_2O_3$ $P=PO_4$

The above-mentioned phases are not pure compounds, but are likely to contain, in a solid solution, impurities such as iron, magnesia (MgO), phosphorus ($P_2O_5$), sulphur, etc.

In addition to the fact that such a process requires using controlled cooling steps, the amounts of alumina and lime sources to be added are important, generally for 25% in weight or more for the alumina source and for 40% in weight or more for the lime source.

SUMMARY OF THE INVENTION

An object of the present invention is thus an oxidative treatment process for raw steel industry slag comprising, based on the raw slag total weight, at least 45% in weight of CaO and less than 30% in weight of $Fe_2O_3$, overcoming the inconveniences of the prior art.

In particular, an object of the present invention is an oxidative treatment process for raw steel industry slag leading to slag which, when mixed with Portland cement or when alone, is an appropriate hydraulic binder, with a C3S content from 40 to 60%, making it possible to reach acceptable mechanical strengths, in particular a compression strength Rc after one day higher than 8 M Pa.

Another object of the present invention is also an oxidative treatment process for a steel industry slag such as defined hereinabove, requiring low amounts of lime sources to be added and, optionally, of alumina and/or silica sources.

The slag to be treated should have a minimal iron content (in the form of FeO or $Fe_2O_3$) such that the final slag has a $Fe_2O_3$ content of 13% in weight minimum. This allows to use relatively low treating temperatures (equal to or lower than 1,500° C.—the slag leaves the ladle at a temperature of approximately 1,650° C. and cools down naturally to 1,450° C. It is judged that the treatment occurs at a temperature close to 1,500° C.) and which do not require any other energy supply than that resulting from oxygen combustion, in particularly which do not require using any additional fuel such as coke.

The above-mentioned aims are achieved, according to the invention, by a process for treating a raw steel industry slag, for converting same into a hydraulic binder at least equivalent to a Portland cement clinker, comprising:

an oxidative treatment process with an oxygen or air supply, or their mixture at a pressure ranging from 1 to 15 bars, preferably from 5 to 10 bars, at a temperature ranging from 1,650° to 1,400° C., preferably ranging from 1,550° C. to 1,450° C., for raw steel industry slag containing, based on the raw slag total weight, at least 45% in weight of CaO and less than 30% in weight of $Fe_2O_3$; and the addition, to such a slag, of a lime source supplemented, if necessary, with a silica source and/or an alumina source, the proportions of the lime source and, optionally, of the silica and/or alumina sources being selected such that the slag has, after conversion and at room temperature, a $Fe_2O_3$ rate of at least 13% in weight and a mineral composition comprising at least 40% in weight of C3S phase and more than 10% in weight, preferably at least 40% in weight, of calcium ferrites in the form of a C2F and/or C4AF phase, based on the treated final slag total weight.

Preferably, the treatment process according to the invention is carried out with no energy supply other than that resulting from the oxygen combustion.

Preferably as well, the final treated slag contains less than 2%, preferably less than 1% in weight of free lime and more preferably, does not contain any at all.

As previously indicated, the raw steel industry slag treated using the process of the invention contains at least 45% in weight of CaO, generally from 45 to 65% in weight of CaO and preferably, from 48 to 62% in weight, based on the raw slag total weight.

Also, the raw slag contains less than 30% in weight of $Fe_2O_3$, preferably less than 30% to 10% in weight of $Fe_2O_3$ and more preferably from 25% to 10% in weight based on the raw slag total weight.

The $Fe_2O_3$ rate in the final treated slag is at least 13% in weight, preferably from 15 to 35%.

Preferably, the initial slag to be treated contains from 5 to 20% of FeO.

Still preferably, the addition proportions are such that the slag, after being converted and at room temperature, has a mineral composition comprising less than 10% in weight of C2S phase, and more preferably, is free of C2S phase.

With the treatment process as described hereinabove, a hydraulic binder is obtained having such behaviour as a Portland cement clinker.

In order to obtain a hydraulic binder, from steel industry slag treated according to the invention, equivalent to a Portland cement, to the hereinabove treated slag, is added, when the slag is being ground, a calcium sulfate source, for example gypsum or anhydrite, so as to improve the hydration kinetics of the slag.

Generally, gypsum or anhydrite amount added is at least 5%, preferably at least 10% in weight based on the treated slag weight.

It is also possible, in order to obtain, from steel industry slag treated according to the invention, a hydraulic binder equivalent to a Portland cement, to mix at least 50% in weight of Portland cement with the treated and ground slag.

Oxidizing the raw steel industry slag can occur either on the liquid slag at a temperature ranging from 1,400 to 1,650° C., preferably from 1,450° C. to 1,550° C., for example, through blowing oxygen, air or a mixture of oxygen and air in the ladle containing the liquid raw slag, or on the solid slag, for example, through a mere contact of the raw slag with the air in a cement factory rotary kiln.

Similarly, adding the lime source and optionally adding alumina and/or silica sources can occur in the liquid or in the solid raw slag. Such additions can be carried out before, during or after raw slag oxidation.

Of course, when the raw slag is in a solid form, it should be heated at a temperature sufficient so as to obtain the desired conversion, generally at a temperature ranging from 1,450 to 1,550° C., typically about 1,500° C.

The lime source may be any appropriate lime source such as lime or a calcium carbonate.

Similarly, the alumina and the silica sources may be pure alumina or pure silica, or bauxite as well.

The amount of lime to be added obviously depends on the chemical composition of the raw slag and may account for up to 30% in weight based on the raw slag weight, but preferably ranges from 5 to 15% in weight, preferably from 8 to 15% in weight.

The alumina amount to be added generally varies from 0 to 10% in weight, whereas the silica amount generally varies from 0 to 5% in weight based on the raw slag weight.

In order to know the contents of the materials to be added to the slag so as to obtain a product comprising between 40 and 60% of C3S, the following procedure should be followed, considering that the slag composition is as follows:

| % CaO | % $SiO_2$ | % $Al_2O_3$ | % $Fe_2O_3$ | % FeO | % $P_2O_5$ | % $TiO_2$ |
|---|---|---|---|---|---|---|
| Y | Z | A | U | V | P | T |

In order to know the silica content to be added:

if Z<10.52, a Z' silica amount is to be added, comprised between (10.52−Z) (so as to reach 40% of C3S phase) and (15.8−Z) (so as to reach 60% of C3S phase), if 10.52≦Z<15.8, a Z' silica amount could be added up to (15.8−Z), and if Z≧15.8, it is unnecessary to add silica to the slag.

The addition of alumina improves the properties of the product resulting from the slag treatment. However, alumina is an expensive product, and often, it will be cost effective to only add a few percentage of it. The alumina addition is referred to as A'.

The lime amount to be added is then given by the following calculation:

$$\% \, CaO_{aj} = (A+A')*1.10+(Z+Z')*2.8+(U+V*1.12)*0.7+P*1.18+T*0.07-Y.$$

Cooling the steel industry slag after treatment should be performed so as to favour the C3S phase formation. The cooling rate generally ranges from 50 to 100° C./minute.

BRIEF DESCRIPTION OF THE DRAWING

The remaining description refers to appended figures respectively representing.

DETAILED DESCRIPTION OF THE INVENTION

Figure 1:
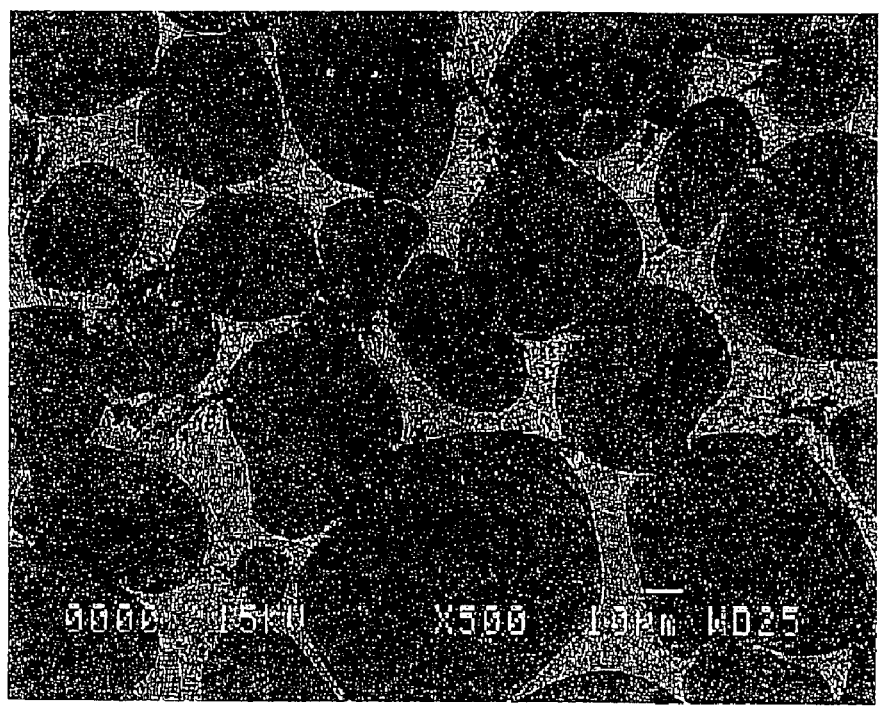
FIG. 1: a slag micrograph from a comparative example.

In the following examples, unless otherwise indicated, all the percentages and parts are expressed in weight.

1. Steel Industry Slag

In order to illustrate the present invention, steel industry slags have been used, with their chemical and mineral compositions being given in the following table.

TABLE II

| Example nr. | Slag nr. | % slag | Additions CaO | Additions $Al_2O_3$ | Additions $SiO_2$ |
|---|---|---|---|---|---|
| C1 | 1 | 100 | — | — | — |
| C2 | 1 | 97 | — | — | 3 |
| C3 | 1 | 94 | 3 | — | 3 |
| C4 | 1 | 91 | 6 | — | 3 |
| C5 | 1 | 88 | 9 | — | 3 |
| C6 | 1 | 85 | 12 | — | 3 |
| C7 | 1 | 94 | — | — | 6 |
| C8 | 1 | 88 | 6 | — | 6 |
| C9 | 1 | 82 | 12 | — | 6 |
| C10 | 1 | 76 | 18 | — | 6 |
| C11 | 1 | 74 | 20 | — | 6 |
| C12 | 1 | 90 | — | — | 10 |
| C13 | 1 | 88 | 8 | 2.4 | 0.5 |
| C14 | 1 | 86 | 10 | 2.4 | 0.5 |
| C15 | 1 | 94 | — | 1.8 | 3.4 |
| C16 | 1 | 96 | — | 2.4 | 0.5 |
| C17 | 1 | 93 | 5 | 1.2 | 0.25 |
| C18 | 1 | 92 | 4 | 1.2 | 2.25 |
| C19 | 1 | 95 | 3 | 1.2 | 0.25 |
| C20 | 2 | 90 | 4 | 1.2 | 4.25 |
| C21 | 1 | 83 | 12 | 3 | 0.62 |

Note:
In examples C16 to C21, the sum of the slag + C + A + S compounds does not amount up to 100% as the alumina addition is made in the form of bauxite, which introduces more particularly some iron percentage (the mean composition of the added bauxite is given hereinbelow:
60% $Al_2O_3$,
12.5% $SiO_2$, and 27.5% $Fe_2O_3$.

TABLE I

| Steel industry slag nr. | Chemical composition (% in weight) | | | | | | | | | Mineralogical composition (% in weight) | | | | |
|---|---|---|---|---|---|---|---|---|---|---|---|---|---|---|
| | $SiO_2$ | $Al_2O_3$ | $Fe_2O_3$ | CaO | MgO | $TiO_2$ | $Mn_2O_3$ | $P_2O_5$ | FeO | Ca ferrite | Wüstite (SS) | C2S/C3P (SS) | Free CaO | Periclase |
| 1 | 14.43 | 3.00 | 14.43 | 49.3 | 4.69 | 0.63 | 1.96 | 1.41 | 10.57 | 32 | 17 | 44 | 7 | 0 |
| 2 | 11.12 | 1.85 | 12.6 | 48.8 | 4.5 | 0.6 | 1.86 | 1.34 | 9.76 | 27 | 12.7 | 40 | 10 | 1.9 |
| 3 | 11.7 | 0 | 26.1 | 49 | 1 | 0.1 | 0.3 | 0.2 | 11.6 | 45 | 11.6 | 34.4 | 8 | 0 |
| 4 | 15.1 | 0 | 17.5 | 56.7 | 0.7 | 0.1 | 0.5 | 0.4 | 9 | 37 | 10.6 | 44.7 | 7 | 0 |
| 5 | 14 | 6.5 | 12.8 | 58.1 | 0.1 | 0.3 | 0.1 | 0.4 | 7.7 | 34.6 | 15.2 | 40.1 | 10 | 0 |

Wüstite SS: Solid solution (Fe, Ca, Mg) O
C2S/C3P SS: solid solution C2 (S, Px)

2. COMPARATIVE EXAMPLES C1 TO C21

The above mentioned slag types have been oxidized and optionally treated with lime and/or silica additions outside the scope of the present invention. The temperature at the start of the treatment is 1,650° C. (outlet temperature from the ladle containing the slag) and is equal to 1,450° C. at the end of the treatment. The oxygen pressure being used is 200 kPa (2 atmospheres) and the treatment total duration is 30 minutes.

The nature and the amount of the additions as well as the resulting chemical and mineral compositions are given in tables II and III.

TABLE III

| Example nr. | Mineral composition (% in weight) | | | |
|---|---|---|---|---|
| | 3S | C2S | CS | % $Fe_2O_3$ |
| C1 | 0 | 46 | 0 | 25 |
| C2 | 0 | 32 | 13 | 24 |
| C3 | 0 | 41 | 7 | 23 |
| C4 | 12 | 56 | 0 | 22 |
| C5 | 12 | 39 | 0 | 22 |
| C6 | 24 | 28 | 0 | 21 |
| C7 | 0 | 24 | 24 | 23 |
| C8 | 0 | 39 | 11 | 22 |
| C9 | 3 | 51 | 0 | 20 |

TABLE III-continued

| | Mineral composition (% in weight) | | | |
|---|---|---|---|---|
| Example nr. | 3S | C2S | CS | % Fe$_2$O$_3$ |
| C10 | 26 | 32 | 0 | 19 |
| C11 | 35 | 23 | 0 | 18 |
| C12 | 0 | 9 | 40 | 23 |
| C13 | 13 | 31 | 0 | 23 |
| C14 | 22 | 22 | 0 | 22 |
| C15 | 0 | 22 | 20 | 24 |
| C16 | 0 | 32 | 8 | 25 |
| C17 | 9 | 35 | 0 | 24 |
| C18 | 0 | 39 | 5 | 24 |
| C19 | 7 | 37 | 0 | 24 |
| C20 | 25 | 22 | 0 | 23 |
| C21 | 25 | 20 | 0 | 22 |

These C1 to C21 runs represent materials whose performance is not satisfactory, because the C3S hydraulic phase proportion they contain is too small.

The C1 run shows that the mere oxidizing step with no mineral supply from the raw steel industry slag has the effect of leading the wüstite (FeO) to disappear and of creating a little hydraulic C2S phase.

Adding silica (runs C2, C7, C12) leads to the disappearance of part of C2S to the benefit of a non hydraulic phase (CS).

If, in addition to silica, increasing lime amounts are added, (runs C3 to C6 or C8 to C11), the hydraulic phase (C3S) percentage is increased.

It is sometimes more cost effective to supply the additions in the form of naturally-occurring minerals such as bauxite (essentially supplying A, S and iron oxides). The addition of bauxite alone will lead to a result equivalent to adding S and A (run C16). Adding S to a bauxite addition will enhance the occurrence of non hydraulic phases such as CS (run C15)

Adding lime to bauxite (runs C13, C14, C17, C19, C21) will result in the occurrence of the C3S phase, like in the case when only adding silica.

In the case of the addition of silica and alumina, more lime should therefore be added so as to compensate for the silica and the alumina supply (runs C18, C20), the lime proportions to be added depending on the respective contents in silica, alumina and lime of the slag being treated.

It can therefore be seen that, if additions are being supplied which do not correspond to the values given by the equations, the resulting compounds do not allow obtaining the aimed C3S phase percentages.

3. Examples 1 to 6

Raw steel industry slag have been treated through oxidizing at a pressure of approximately 10 bars, for 30 minutes, with lime additions and, optionally, alumina and silica additions according to the invention. The temperature at the start of the treatment is 1,650° C. (temperature of the slag at the outlet of the ladle).

The slag used, the addition proportions and the resulting mineral phases are shown in tables IV and V below.

TABLE IV

| Example nr. | Slag nr. | % slag | Additions | | |
|---|---|---|---|---|---|
| | | | CaO | Al$_2$O$_3$ | SiO$_2$ |
| 1 | 3 | 90 | 10 | — | — |
| 2 | 5 | 89 | 9 | — | 2 |
| 3 | 6 | 95 | 5 | — | — |
| 4 | 1 | 89 | 11 | — | — |
| 5 | 1 | 88 | 12 | — | — |
| 6 | 1 | 82 | 15 | 3 | — |

TABLE V

| | Mineral composition (% in weight) | | | | |
|---|---|---|---|---|---|
| Example nr. | C3S | C2S | CS | C2F/C4AF ferrite solid solution | % Fe$_2$O$_3$ |
| 1 | 42 | — | — | 58 | 34 |
| 2 | 55 | — | — | 41 | 24 |
| 3 | 54 | — | — | 47 | 20 |
| 4 | 44 | 6 | — | 46 | 22 |
| 5 | 48 | 3 | — | 45 | 22 |
| 6 | 47 | 1 | — | 48 | 20 |

Figure 2:
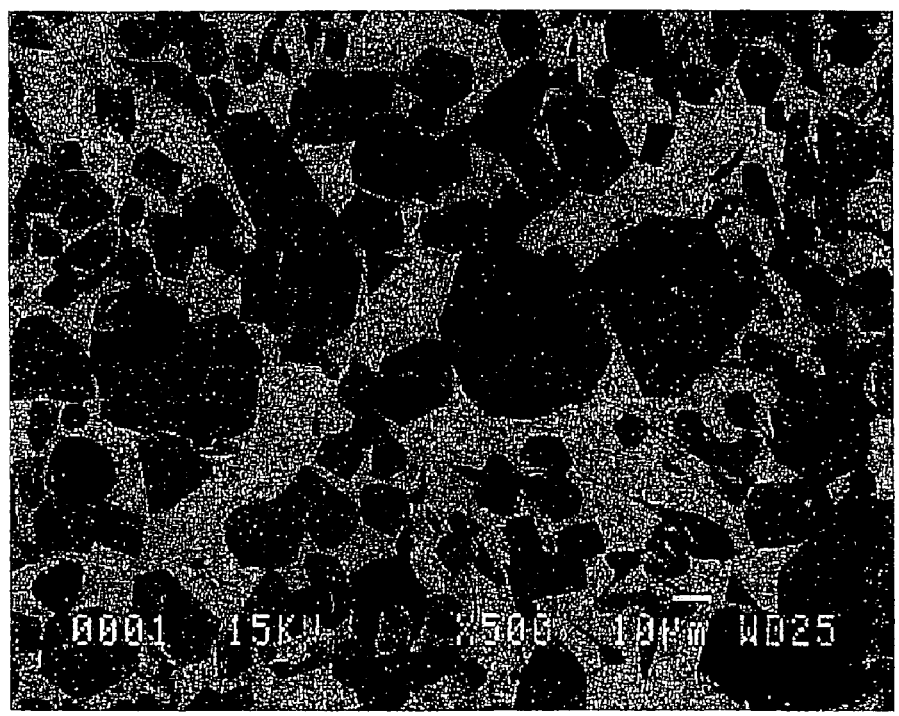
FIG. 2: a slag micrograph according to the invention.

FIG. 1 is a micrograph from example C8. The "beads" shown on this micrograph are C2S, the interstitial phase consisting in CS and ferritic FIG. 2 is a micrograph from example 3. The "prisms" shown on this micrograph are C3S, the interstitial phase consisting in ferritic phase.

Two application series of runs have been performed from treated slag obtained either from the comparative examples C1 to C21 or from examples 1 to 6 according to the invention.

In the first series, the results of which are shown in table VI-A, each of the slag types has been mixed in a 50/50 weight ratio with Portland cement.

Standard mortar test tubes have been made with each of such blends, according to the EN 196-1 standard, and the compressive mechanical strengths measured at 1 day and 28 days.

The results are given after gathering the various slag types into classes, as a function of their C3S phase content.

For each class, the specified mechanical strength values are the minimum and the maximum being obtained, depending on the considered slag.

TABLE VI-A

| C3S phase % in weight | 0 | 1–7 | 7–15 | 20–30 | 35 | 40–50 | >50 |
|---|---|---|---|---|---|---|---|
| Treated slag nr. | C1/C2/C3/ C7/C8/ C12/C15/ C16 | C4/C9/ C18 | C5/ C13/ C17/ C19 | C6/C10/ C14/ C20/ C21 | C11 | 1/4/5/6 | 2/3 |
| Portland cement, % weight | 50 | 50 | 50 | 50 | 50 | 50 | 50 |
| Rc 1 day, MPa | 4–6 | 4–6 | 4–6 | 4–6 | 6–8 | 10–14 | 3–17 |
| Rc 28 days, MPa | 13–17 | 20–24 | 32–38 | 36–44 | 42–52 | 45–55 | 50–60 |

Mr: Mechanical resistance

In the second series, the results of which are given in table VI-B below, each of the slag types has been ground with 10% gypsum and the same runs have been performed as in the previous series.

TABLE VI-B

| C3S phase % in weight | 0 | 1–7 | 7–15 | 20–30 | 35 | 40–50 | >50 |
|---|---|---|---|---|---|---|---|
| Treated slag nr. | C2/C3/C7/ C8/C12/ C15/C16 | C4/ C9/ C18 | C5/ C13/ C17/ C19 | C6/C10/ C14/ C20/ C21 | C11 | 1/4/5/6 | 2/3 |
| Gypsum % in weight | 10 | 10 | 10 | 10 | 10 | 10 | 10 |
| Rc 1 day, MPa | 0 | 0 | 0 | 1–3 | 1–3 | 10–14 | 13–17 |
| Rc 28 days, MPa | 0 | 1–3 | 9–11 | 18–22 | 20–24 | 34–42 | 39–47 |

The obtained results show that the slag types treated according to the invention, as opposed to those from the comparative examples, make it possible to obtain compressive mechanical strengths, according to the EN 196-1 standard, much higher than 8 Mpa at 1 day, regardless whether those slag types are mixed or not with a Portland cement.

The mechanical strengths at 28 days are those of a Portland cement corresponding, according to the EN-197-1 standard, to classes 32.5 or 42.5.

What is claimed is:

1. A process for treating a raw steel industry slag, for conversion of said raw steel industry slag into a hydraulic binder at least equivalent to a Portland cement clinker, said raw steel industry slag containing, based on the raw steel industry slag total weight, at least 45% of CaO and less than 30% of $Fe_2O_3$, said process comprising:
   a) treating said raw steel industry slag with oxygen or air or a mixture thereof, at a pressure ranging from 1 to 15 bars and at a temperature ranging from 1, 650° C. to 1,400° C.; and
   b) adding to said raw steel industry slag before, during or after treatment step a), a lime source optionally supplemented with a silica source and/or an alumina source, the proportions of the lime source and optionally of the silica and/or alumina sources being selected such that, after conversion and at room temperature, there is obtained a final treated slag having a $Fe_2O_3$ content of at least 13% by weight, a mineral composition comprising at least 40% by weight of the C3S mineral phase, and more than 10% by weight of calcium ferrite in the form of a C2F and/or C4AF mineral phase, based on the final treated slag total weight.

2. The process according to claim 1, wherein treatment step a) occurs with no other energy supply than that resulting from a combustion of oxygen.

3. The process according to claim 1, wherein the final treated slag contains less than 2% by weight of free lime based on the final treated slag total weight.

4. The process according to claim 1, wherein the final treated slag, after conversion and at room temperature, comprises less than 10% by weight of C2S mineral phase.

5. The process according to claim 1, wherein the lime source is lime or a calcium carbonate.

6. The process according to claim 1, wherein the alumina source is bauxite.

7. The process according to claim 1, wherein the lime amount added to the raw steel industry slag is at most 30% by weight based on the raw steel industry slag weight.

8. The process according to claim 1, wherein the lime amount added to the raw steel industry slag accounts for 5 to 15% by weight of the raw steel industry slag.

9. The process according to claim 1, wherein the alumina source amount added to the raw steel industry slag accounts for 0 to 10% by weight of the raw steel industry slag, and the silica source amount added to the raw steel industry slag accounts for 0 to 5% by weight of the raw steel industry slag.

10. Process for obtaining, from a raw steel industry slag, a hydraulic binder equivalent to a Portland cement, which comprises: mixing at least 50% by weight of a Portland cement to a final treated slag resulting from the treatment process according to claim 1, based on the final treated slag weight.

11. Process for obtaining, from a raw steel industry slag, a hydraulic binder equivalent to a Portland cement, which comprises mixing, to a final treated slag resulting from the process according to claim 1, at least 5% by weight of a calcium sulphate source, based on the final treated slag weight.

12. The process according to claim 11, wherein at least 10% by weight of a calcium sulphate source, based on the final treated slag weight, is mixed to the final treated slag.

13. The process according to claim 11, wherein the calcium sulphate source is gypsum or anhydrite.

14. The process according to claim 1, wherein said pressure ranges from 5 to 10 bars.

15. The process according to claim 1, wherein said temperature ranges from 1,550° C. to 1,450° C.

16. The process according to claim 1, wherein the final treated slag comprises at least 40% by weight of calcium ferrite.

17. The process according to claim 3, wherein the final treated slag comprises less than 1% by weight of free lime.

* * * * *

UNITED STATES PATENT AND TRADEMARK OFFICE
CERTIFICATE OF CORRECTION

PATENT NO. : 6,946,014 B2
DATED : September 20, 2005
INVENTOR(S) : Poupardin et al.

It is certified that error appears in the above-identified patent and that said Letters Patent is hereby corrected as shown below:

<u>Title page,</u>
Item [12], should read as follows:
-- [12]         Michaud Poupardin et al. --.

Signed and Sealed this

Eighth Day of November, 2005

JON W. DUDAS
*Director of the United States Patent and Trademark Office*